(12) United States Patent
Hofmann et al.

(10) Patent No.: US 10,796,045 B2
(45) Date of Patent: Oct. 6, 2020

(54) EFFICIENT BI-DIRECTIONAL PROPERTY-BASED PATH TRACING

(71) Applicant: Mentor Graphics Corporation, Wilsonville, OR (US)

(72) Inventors: Mark E. Hofmann, Portland, OR (US); Sridhar Srinivasan, Tualatin, OR (US)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 16/432,396

(22) Filed: Jun. 5, 2019

(65) Prior Publication Data

US 2019/0377839 A1 Dec. 12, 2019

Related U.S. Application Data

(60) Provisional application No. 62/681,089, filed on Jun. 6, 2018.

(51) Int. Cl.
| | |
|---|---|
| *G06F 17/50* | (2006.01) |
| *G06F 30/327* | (2020.01) |
| *G06F 30/367* | (2020.01) |
| *G06F 30/20* | (2020.01) |
| *G06F 30/33* | (2020.01) |
| *G06F 30/398* | (2020.01) |

(52) U.S. Cl.
CPC .......... *G06F 30/327* (2020.01); *G06F 30/367* (2020.01); *G06F 30/20* (2020.01); *G06F 30/33* (2020.01); *G06F 30/398* (2020.01)

(58) Field of Classification Search
CPC ...... G06F 30/327; G06F 30/367; G06F 30/20; G06F 30/33; G06F 30/398
USPC .................... 716/104, 106, 111, 136; 703/16
See application file for complete search history.

(56) References Cited

U.S. PATENT DOCUMENTS

| | | | |
|---|---|---|---|
| 2006/0095881 A1* | 5/2006 | Kwon | ................... G06F 30/367 716/122 |
| 2012/0221509 A1* | 8/2012 | Gao | ..................... G06F 16/254 707/602 |

* cited by examiner

*Primary Examiner* — Phallaka Kik

(57) ABSTRACT

Systems and methods for efficient bi-directional property-based path tracing. The method includes reading a data structure corresponding to a circuit. The method also includes iteratively performing property accounting of properties as voltages propagate across devices in the circuit. The method also includes traversing series chains of similar devices in the circuit to reduce an iteration count and arrive at a circuit stability, wherein the circuit stability is determined when propagated user-specified and computed circuit properties (e.g. shortest distance) remain unchanged between subsequent iterations of the traversing. The method also includes traversing the data structure for propagated user-specified and computed property violations. The method also includes cataloging and reporting these violations in human-readable form.

21 Claims, 15 Drawing Sheets

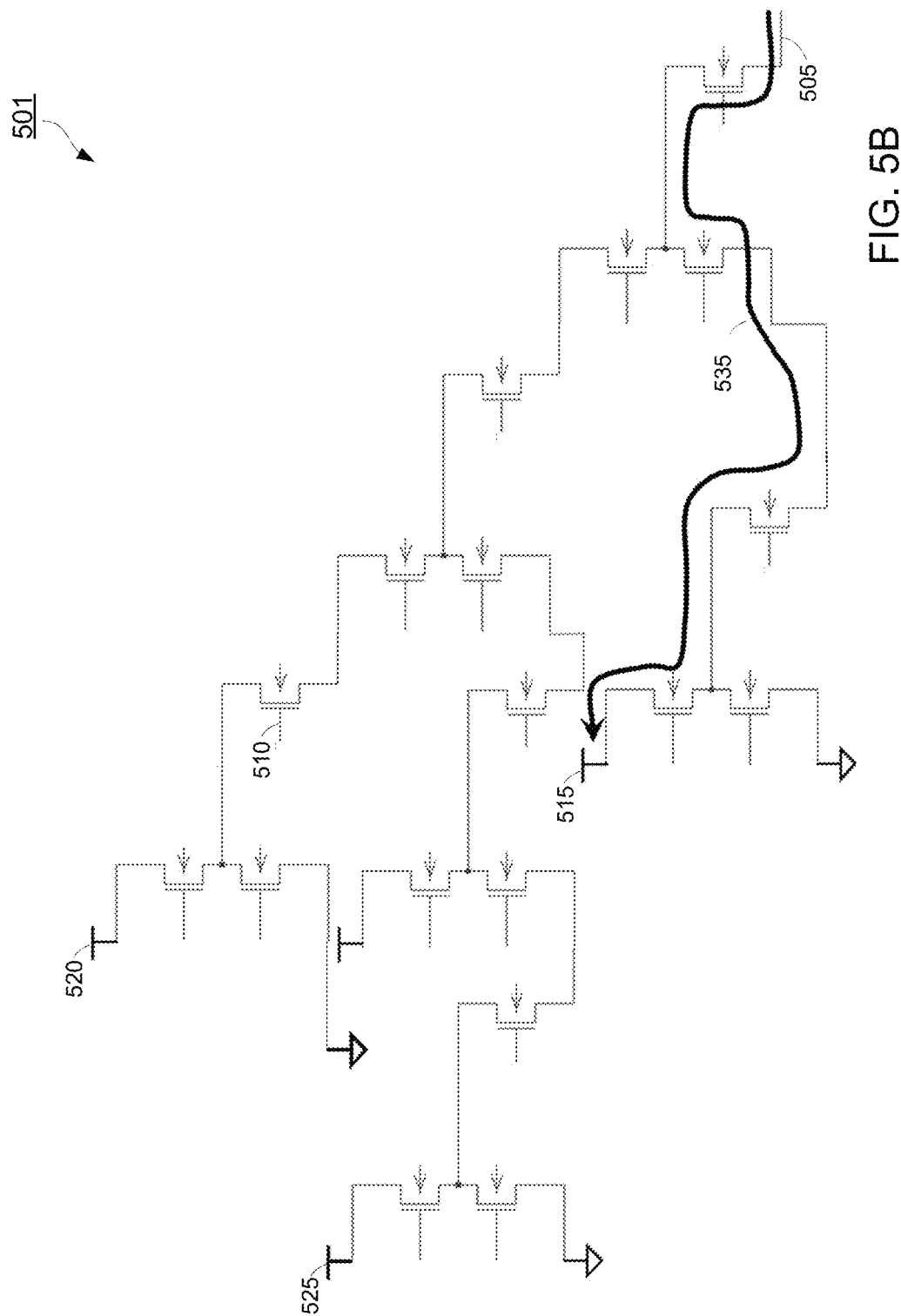

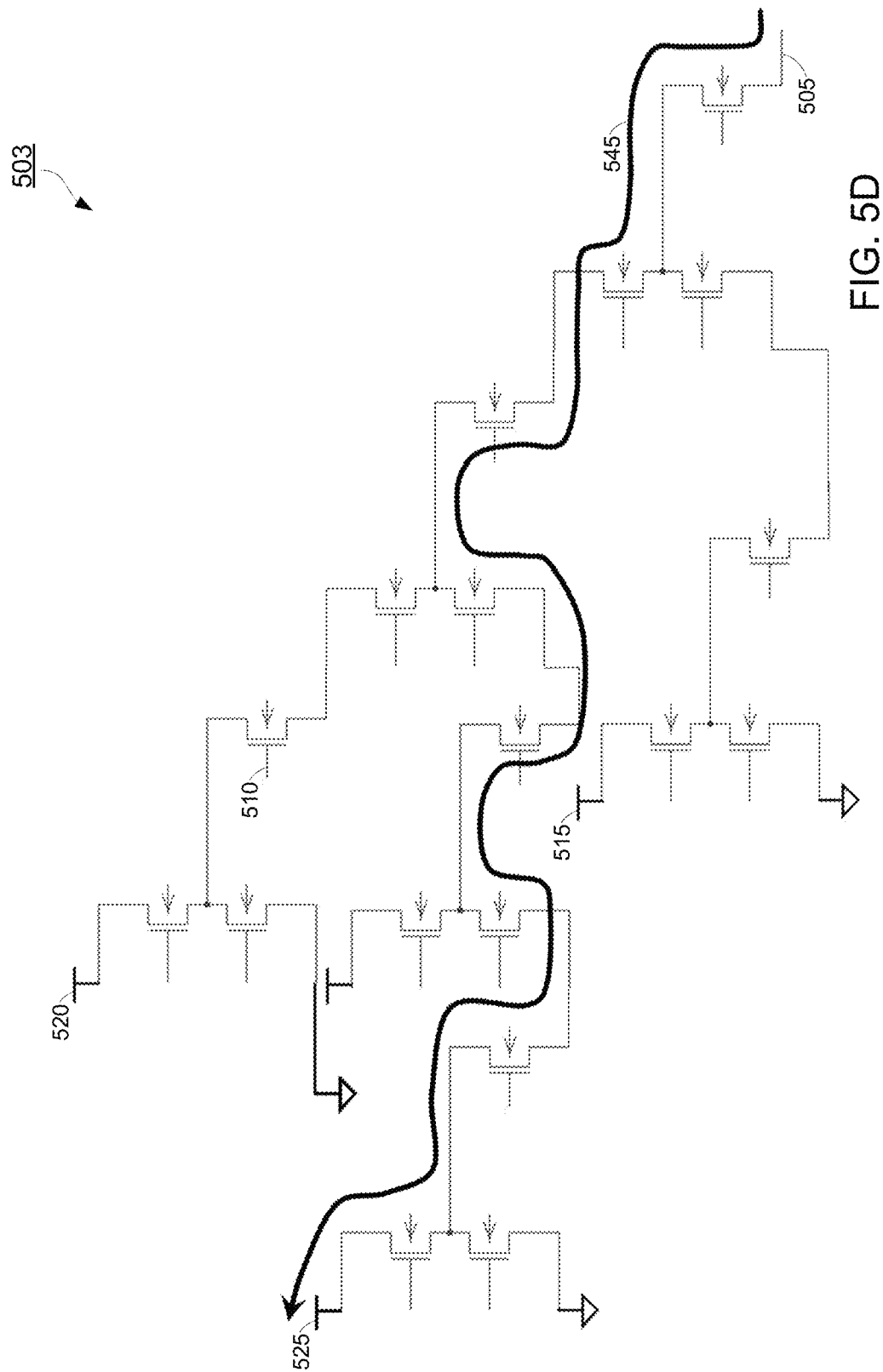

EFFICIENT BI-DIRECTIONAL PROPERTY-BASED PATH TRACING

PRIORITY CLAIM

This application claims priority to U.S. Provisional Patent Application No. 62/681,089 filed Jun. 6, 2018 and entitled EFFICIENT BI-DIRECTIONAL PROPERTY-BASED PATH TRACING. The content of the above-identified patent documents is incorporated herein by reference.

TECHNICAL FIELD

The disclosed technology is directed techniques for circuit design, testing, and manufacture.

BACKGROUND OF THE DISCLOSURE

Electronic circuits, such as integrated microcircuits, are used in a variety of products, from automobiles to microwaves to personal computers. Designing and fabricating microcircuit devices typically involves many steps, known as a "design flow." The particular steps of a design flow often are dependent upon the type of microcircuit being designed, its complexity, the design team, and the microcircuit fabricator or foundry that will manufacture the microcircuit. Typically, software and hardware tools will verify a design at various stages of the design flow by running software simulators and/or hardware emulators, and errors in the design are corrected.

Several steps are common to most design flows. Initially, the specification for the new microcircuit is transformed into a logical design, sometimes referred to as a register transfer level (RTL) description of the circuit. With this logical design, the circuit is described in terms of both the exchange of signals between hardware registers and the logical operations that are performed on those signals. The logical design typically employs a hardware design language (HDL), such as the very high speed integrated circuit hardware design language (VHDL). The logic of the circuit is then analyzed, to confirm that the logic incorporated into the design will accurately perform the functions desired for the circuit. This analysis is sometimes referred to as "functional verification."

After the accuracy of the logical design is confirmed, it is converted into a device design by synthesis software. The device design, which is typically in the form of a schematic or netlist, describes the specific electronic devices (such as transistors, resistors, and capacitors) that will be used in the circuit, along with their interconnections. This logic generally corresponds to the level of representation displayed in conventional circuit diagrams. Preliminary timing estimates for portions of the circuit may be made at this stage, using an assumed characteristic speed for each device. In addition, the relationships between the electronic devices are analyzed, to confirm that the circuit described by the device design will correctly perform the functions desired for the circuit. This analysis is sometimes referred to as "formal verification."

Once the relationships between circuit devices have been established, the design is again transformed, this time into a physical design that describes specific geometric elements. This type of design often is referred to as a "layout" design. The geometric elements define the shapes that will be created in various materials to actually manufacture the circuit device components (e.g., contacts, gates, etc.) making up the circuit. While the geometric elements are typically polygons, other shapes, such as circular and elliptical shapes, also may be employed. These geometric elements may be custom designed, selected from a library of previously created designs, or some combination of both. Geometric elements also are added to form the connection lines that will interconnect these circuit devices. Layout tools (often referred to as "place and route" tools), such as Mentor Graphics' IC Station or Cadence's Virtuoso, are commonly used for both of these tasks.

With a layout design, each physical layer of the microcircuit will have a corresponding layer representation, and the geometric elements described in a layer representation will define the relative locations of the circuit device components that will make up a circuit device. Thus, the geometric elements in the representation of an implant layer will define the regions where doping will occur, while the geometric elements in the representation of a metal layer will define the locations in a metal layer where conductive wires used will be formed to connect the circuit devices. Typically, a designer will perform a number of analyses on the layout design. For example, the layout design may be analyzed to confirm that it accurately represents the circuit devices and their relationships described in the device design. The layout design also may be analyzed to confirm that it complies with various design requirements, such as minimum spacing between geometric elements. Still further, it may be modified to include the use of redundant or other compensatory geometric elements intended to counteract limitations in the manufacturing process, etc. This analysis is sometimes referred to as "physical verification."

After the layout design has been finalized, then it is converted into a format that can be employed by a mask or reticle writing tool to create a mask or reticle for use in a photolithographic manufacturing process. Masks and reticles are typically made using tools that expose a blank reticle to an electron or laser beam. Most mask writing tools can only "write" certain kinds of polygons, however, such as right triangles, rectangles or other trapezoids. Moreover, the sizes of the polygons are limited physically by the maximum beam aperture size available to the tool. Accordingly, larger geometric elements in the layout design, or geometric elements that are not basic right triangles, rectangles or trapezoids (which typically is a majority of the geometric elements in a layout design) must be "fractured" into the smaller, more basic polygons that can be written by the mask or reticle writing tool.

Once the layout design has been fractured, then the layout design data can be converted to a format compatible with the mask or reticle writing tool. Examples of such formats are manufacturing electron beam exposure system (MEBES), for raster scanning machines manufactured by ETEC, an Applied Materials Company, the ".MIC" format from Micronics AB in Sweden, and various vector scan formats for Nuflare, JEOL, and Hitachi machines, such as VSB12 or VSB12. The written masks or reticles can then be used in a photolithographic process to expose selected areas of a wafer in order to produce the desired integrated circuit devices on the wafer.

SUMMARY OF THE DISCLOSURE

Various disclosed embodiments include systems and methods for efficient bi-directional property-based path tracing. The method includes reading a data structure corresponding to a circuit. The method also includes iteratively performing property accounting of properties as voltages cross devices in the circuit. The method also includes traversing series chains of similar devices in the circuit to reduce an iteration count and arrive at a circuit stability, wherein the circuit stability is determined when user-specified circuit properties remain unchanged between subsequent iterations of the traversing. The method also includes traversing the data structure for user-specified property violations. The method also includes cataloging and reporting these violations in human-readable form.

Some embodiments further include recognizing a series chain in the circuit. In some embodiments recognizing the series chain in the circuit can include ordering the similar devices in a manner that an iteration-to-property-stability count is a constant value, that is the iteration count does not depend on the number of devices in the series chain; and storing property information with device information in the data structure. Some embodiments further include interrogating pin voltages and corresponding properties on each pin of the devices; and storing the pin voltages and the corresponding properties with the device information in the data structure. Some embodiments further include traversing the circuit backwards from a user-specified start point at a sink to a voltage source to construct a net-pin-device-pin-net-pin-device circuit path. In some embodiments, a number of iterations required to attain property stability is reduced by recognizing hierarchical and repetitive elements in the circuit; hierarchical elements are identified explicitly in the read data structure or recognized during the iteratively performed property accounting of the properties, and repetitive elements are identified by pattern-matching in the iteratively performed property accounting of the properties. In some embodiments, the iteratively performed property accounting of the properties includes prioritizing device iteration direction of current flow to reduce an iteration-to-property-stability count using circuit theory laws. In some embodiments, a property stability of a user-specified property is conditional on a second property, circuit stability is attained when both the user-specified property and the second property remain unchanged for all data structure devices and nets between subsequent iterations.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIGS. 5A-5D illustrate example tree-like netlists with same-voltage paths in accordance with disclosed embodiments;

DETAILED DESCRIPTION

The Figures discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Illustrative Operating Environment

The execution of various processes described herein may be implemented using computer-executable software instructions executed by one or more programmable computing devices. Because these processes may be implemented using software instructions, the components and operation of a generic programmable computer system on which various embodiments of these processes may be employed will first be described. Further, because of the complexity of some electronic design and testing processes and the large size of many circuit designs, various electronic design and testing tools are configured to operate on a computing system capable of simultaneously running multiple processing threads. The components and operation of a computer system having a host or master computer and one or more remote or slave computers therefore will be described with reference to FIG. 1. This operating environment is only one example of a suitable operating environment, however, and is not intended to suggest any limitation as to the scope of use or functionality of any implementations of the invention.

Figure 1:
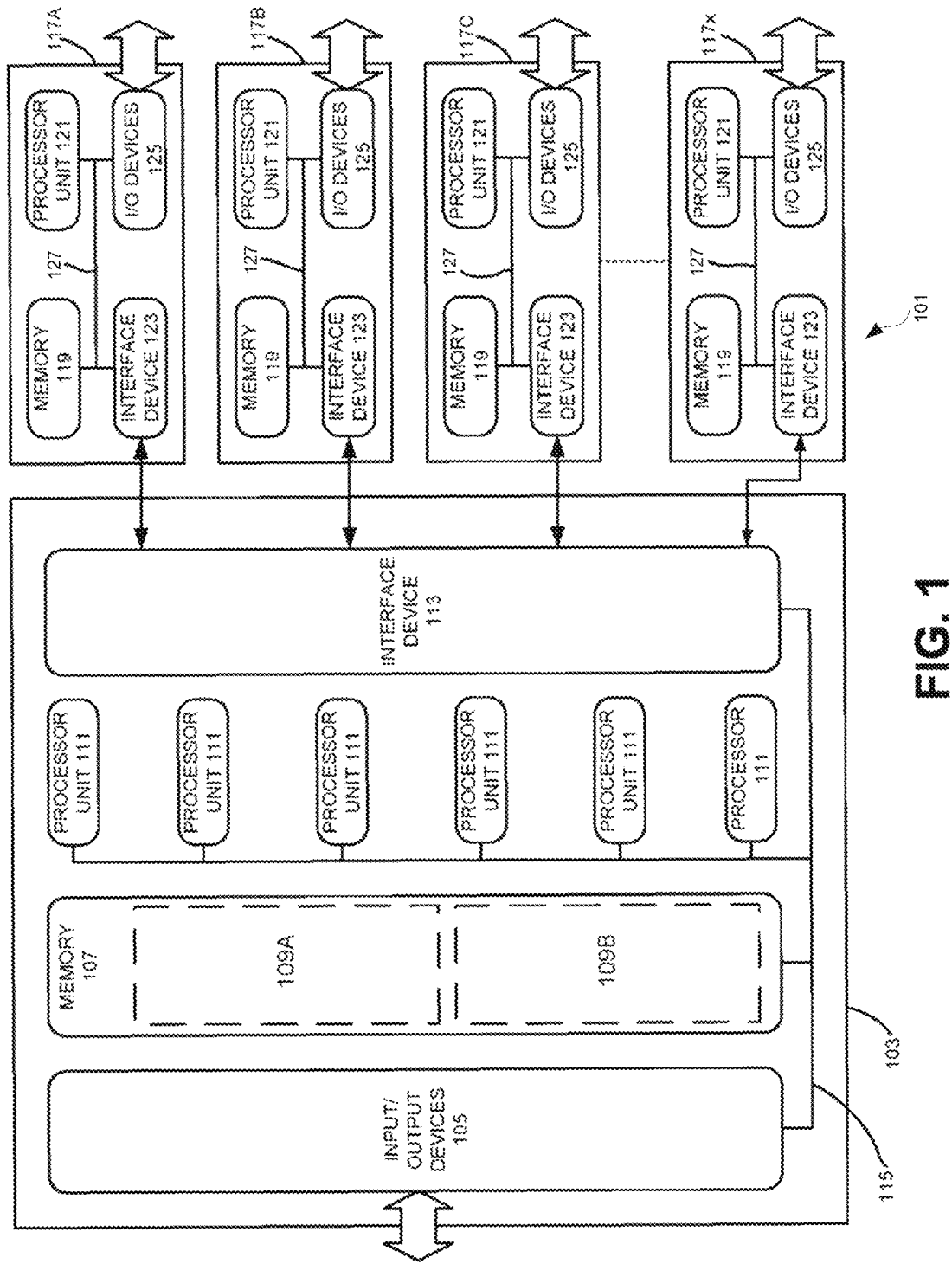
FIGS. 1 and 2 illustrate components of a computer system that may be used to implement various embodiments of the disclosed technology.

In FIG. 1, the computer system 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other non-transitory storage medium that can be used to store desired information. As used herein, the term "non-transitory" refers to the ability to store information for subsequent retrieval at a desired time, as opposed to propagating electromagnetic signals.

As will be discussed in detail below, the master computer 103 runs a software application for performing one or more operations according to various examples of the invention. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire®. microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
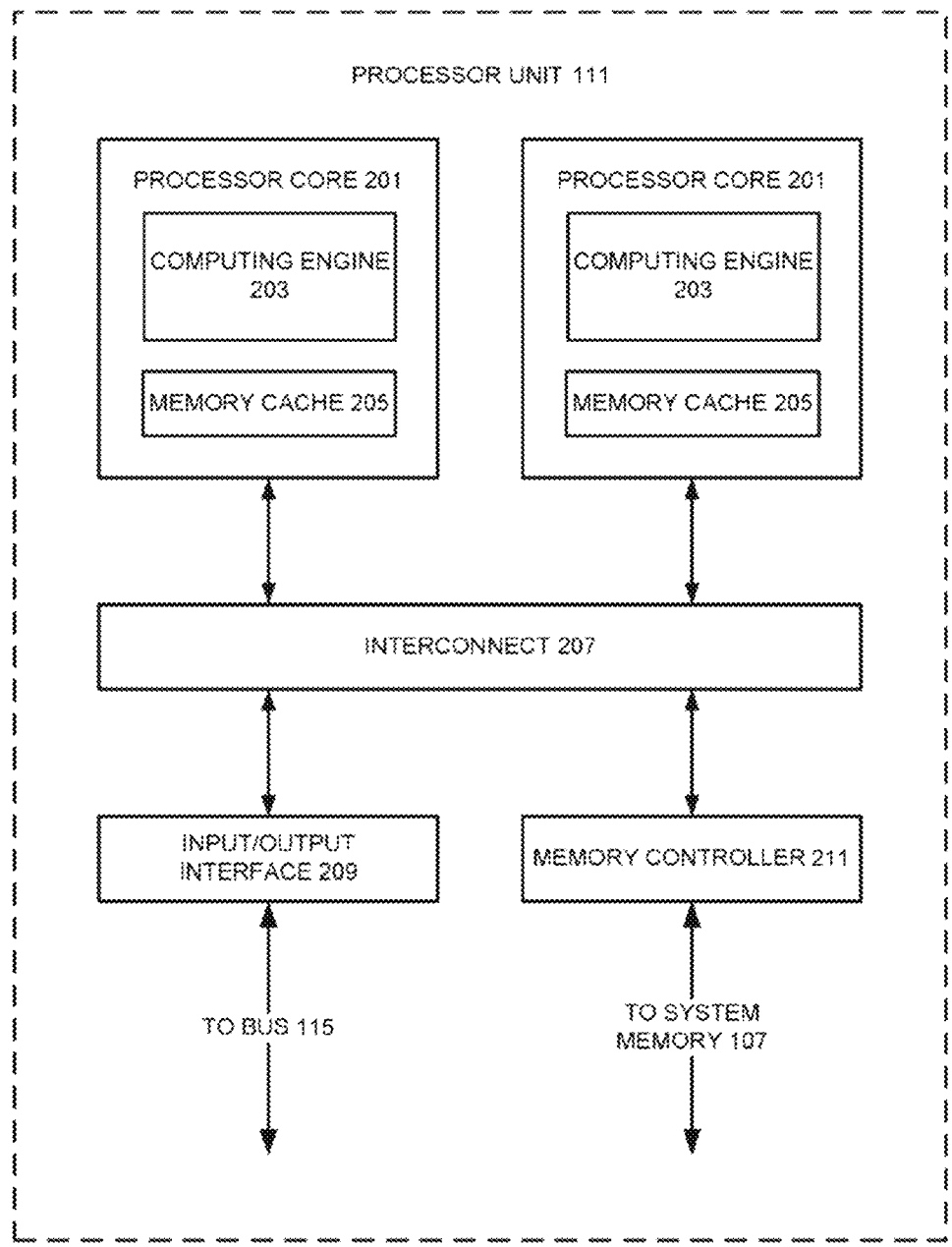

With some implementations of the invention, the master computer 103 may employ one or more processing units 111 having more than one processor core. Accordingly, FIG. 2 illustrates an example of a multi-core processor unit 111 that may be employed with various embodiments of the invention. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interfaces 209 and a memory controller 211. The input/output interface 209 provides a communication interface between the processor unit 201 and the bus 115. Similarly, the memory controller 211 controls the exchange of information between the processor unit 201 and the system memory 107. With some implementations of the invention, the processor units 201 may include additional components, such as a high-level cache memory accessible shared by the processor cores 201.

While FIG. 2 shows one illustration of a processor unit 201 that may be employed by some embodiments of the invention, it should be appreciated that this illustration is representative only, and is not intended to be limiting. It also should be appreciated that, with some implementations, a multi-core processor unit 111 can be used in lieu of multiple, separate processor units 111. For example, rather than employing six separate processor units 111, an alternate implementation of the computing system 101 may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the slave computers 117A, 117B, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the slave computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each slave computer 117 may include a memory 119, a processor unit 121, an interface device 123, and, optionally, one more input/output devices 125 connected together by a system bus 127. As with the master computer 103, the optional input/output devices 125 for the slave computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel®. Pentium®. or Xeon™ microprocessors, Advanced Micro Devices Athlon™ microprocessors or Motorola 68K/Coldfire®. microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. The memory 119 then may be implemented using any combination of the computer readable media discussed above. Like the interface device 113, the interface devices 123 allow the slave computers 117 to communicate with the master computer 103 over the communication interface.

In the illustrated example, the master computer 103 is a multi-processor unit computer with multiple processor units 111, while each slave computer 117 has a single processor unit 121. It should be noted, however, that alternate implementations of the technology may employ a master computer having single processor unit 111. Further, one or more of the slave computers 117 may have multiple processor units 121, depending upon their intended use, as previously discussed. Also, while only a single interface device 113 or 123 is illustrated for both the master computer 103 and the slave computers, it should be noted that, with alternate embodiments of the invention, either the computer 103, one or more of the slave computers 117, or some combination of both may use two or more different interface devices 113 or 123 for communicating over multiple communication interfaces.

With various examples of the computer system 101, the master computer 103 may be connected to one or more external data storage devices. These external data storage devices may be implemented using any combination of non-transitory computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the computer system 101, one or more of the slave computers 117 may alternately or additions be connected to one or more external non-transitory data storage devices. Typically, these external non-transitory data storage devices will include data storage devices that also are connected to the master computer 103, but they also may be different from any data storage devices accessible by the master computer 103.

It also should be appreciated that the description of the computer system 101 illustrated in FIG. 1 and FIG. 2 is provided as an example only, and it not intended to suggest any limitation as to the scope of use or functionality of various embodiments of the invention.

A net is generally taken to mean a physical connection (e.g. a wire) between two different pins. For example, a net can represent the connection of the source pin of one MOS transistor to the drain pin of another MOS transistor, or a connection between two pins of the same device A path generally refers to a sequence of one or more nets. So, for example, a net may interconnect two transistors A and B while a path might connect transistor A to B to C to D, and so forth.

A netlist describes a circuit, which is a collection of physical devices (transistors, resistors, diodes . . . ) that are hooked up via physical wires (e.g. made of aluminum, copper).

A graph is a mathematical construct that can be used to represent a netlist. A graph is made up of vertices and edges. Often a graph vertex is used to represent a device and a graph edge is used to represent a net. All graphs have a topological dual and it is possible to turn every graph into its dual by replacing each edge with a vertex and each vertex with an edge. This replacement is sometimes used in circuit theory where it may be more convenient to think of a device as an edge and a net as a vertex.

A node is used to mean a vertex in a graph and a device or net in a circuit.

Hierarchical Design Organization

The design of a new integrated circuit may include the interconnection of millions of transistors, resistors, capacitors, or other electrical structures into logic circuits, memory circuits, programmable field arrays, and other circuit devices. In order to allow a computer to more easily create and analyze these large data structures (and to allow human users to better understand these data structures to assist in the computer's creating and analysis of these large data structures), they are often hierarchically organized into smaller data structures, typically referred to as "cells." Thus, for a microprocessor or flash memory design, all of the transistors making up a memory circuit for storing a single bit may be categorized into a single "bit memory" cell. Rather than having to enumerate each transistor individually, the group of transistors making up a single-bit memory circuit can thus collectively be referred to and manipulated as a single unit.

Similarly, the design data describing a larger 16-bit memory register circuit can be categorized into a single cell. This higher level "register cell" might then include sixteen bit memory cells, together with the design data describing other miscellaneous circuitry, such as an input/output circuit for transferring data into and out of each of the bit memory cells. Similarly, the design data describing a 128 kB memory array can then be concisely described as a combination of only 64,000 register cells, together with the design data describing its own miscellaneous circuitry, such as an input/output circuit for transferring data into and out of each of the register cells. Of course, while the above-described example is of design data organized hierarchically based upon circuit structures, circuit design data may alternately or additionally be organized hierarchically according to any desired criteria including, for example, a geographic grid of regular or arbitrary dimensions (e.g., windows), a memory amount available for performing operations on the design data, design element density, etc.

By categorizing microcircuit design data into hierarchical cells, large data structures can be processed more quickly and efficiently. For example, a circuit designer typically can analyze a design to ensure that each circuit feature described in the design complies with design rules specified by the foundry that can manufacture microcircuits from the design. With the above example, instead of having to analyze each feature in the entire 128 kB memory array, a design rule check process can analyze the features in a single bit cell. The results of the check can then be applicable to all of the single bit cells. Once the design rule check process has confirmed that one instance of the single bit cells complies with the design rules, the design rule check process can then complete the analysis of a register cell simply by analyzing the features of its additional miscellaneous circuitry (which may itself be made of up one or more hierarchical cells). The results of this check can then be applicable to all of the register cells. Once the design rule check process has confirmed that one instance of the register cells complies with the design rules, the design rule check software application can complete the analysis of the entire 128 kB memory array simply by analyzing the features of the additional miscellaneous circuitry in the memory array. Thus, the analysis of a large data structure can be compressed into the analyses of a relatively small number of cells making up the data structure.

Voltage Propagation

Many power-efficient circuit designs today have multiple voltage domains. Device electrical overstress occurs when a low-voltage device is driven by a high-voltage power rail, signal, or bulk connection with the potential to cause long-term or permanent damage (usually in the form of oxide breakdown). This damage results in circuit degradation or failure over time. Conversely, when insufficient voltage is applied to a high-voltage device and the device is driven by a low-voltage net, the device may not switch, or may switch slowly, again degrading circuit performance.

Thin-oxide transistors, used extensively at advanced nodes, are less robust against electrical failure and impose new electrical overstress verification challenges. Thinner oxide generally allows for the use of lower voltage and provides less power. When power domain design errors occur, effects such as negative bias temperature instability (NBTI) can lead to the threshold voltage of the PMOS transistors increasing over time, resulting in reduced switching speeds for logic gates, and hot carrier injection (HCI) issues, altering the threshold voltage of NMOS devices over time. Soft breakdown (SBD), as a time-dependent failure mechanism, also contributes to the degradation effects of gate oxide breakdown.

Electrical overstress is an important concern for both analog and digital designers, due to the variety of power conditions commonly used in all designs, such as multiple power domains, standby/wake-up/low power/power-down conditions (in which there is no bias current, but the battery is present), and the presence of high-voltage signals. Understanding device pin voltages in all modes of operation is thus critical for detecting potential electrical overstress issues. The ability to identify device breakdown, recognize reverse breakdown issues in high-voltage areas, and detect maximum voltage across gate oxides are all part of a robust electrical overstress detection strategy. However, verifying device operating voltage conditions in voltage-controlled designs is very complicated.

Many design teams employ SPICE simulations and user-generated marker layers or text points to check for electrical overstress, but this is an error-prone method because it requires the designer to manually determine how voltages propagate throughout the design, and manually mark the correct regions for high-voltage design rules. Markers are also extremely difficult to maintain as the design is changed.

With consumer expectations for longer device operation at sustained performance levels, designing for reliability is no longer an optional product feature, but a necessary and integral part of a product's specifications. Designers need verification tools and techniques that go beyond the traditional triumvirate of design rule checking (DRC), layout vs. schematic (LVS) comparison, and electrical rule checking (ERC) to provide thorough detection of and protection against electrical overstress conditions.

Circuit designs and layout designs are also reviewed for reliability issues caused by the electrical system, sometimes referred to as reliability verification. Reliability verification can include reviewing the design for protection from electrostatic discharge (ESD) events, detecting electrical overstress (EOS) situations, performing voltage-aware design rule checking (DRC), or the like. Tools that can detect electrical overstress situations and perform voltage-aware design rule checking, often do so in a two-stage process—performing voltage propagation through the design, for example, at the schematic-level, and then comparing particular circuits in the design and their corresponding propagated voltages to various electric rules or design rules. Since reliability verification is typically performed without design simulation, i.e., without an understanding of electrical performance of the devices in the design, the tools often propagate a common voltage throughout the design, perform rule checking based on that common voltage, and determine a presence of electrical violations.

Voltage propagation can be performed in a vectored mode (circuit input states provided), a vectorless mode (only power/ground rails provided), or a hybrid mode. In a vectorless mode, for example, transistors may be assumed to be turned on and voltage values are propagated directly across them. In some cases, voltage values can only be propagated across a transistor in one direction (e.g., only from one terminal connected directly to a power or ground rail). Nets connected to power supply or ground rails are an example of break nets (i.e., nets to which voltage values are not propagated). A net is a conductor interconnecting two or more terminals of components of the circuit design. Other components like inductors or resistors may be treated as short connections while diodes and capacitors may be considered as open circuits. These rules may be set as default rules for vectorless voltage propagation. Users may provide rules for particular components of the circuit design. For example, users may specify that certain transistors should be assumed to be in an "off" state during the voltage propagation process.

Figure 3:
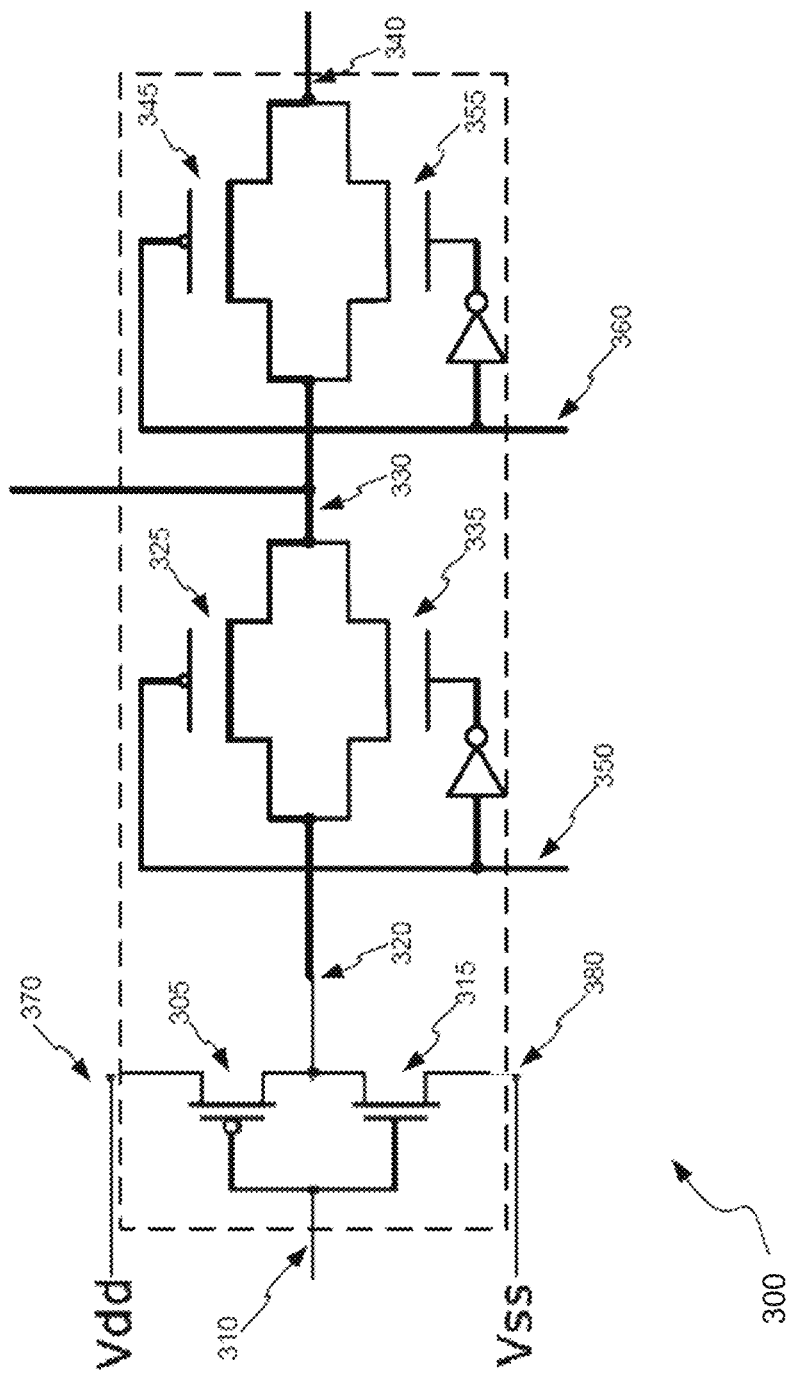
FIG. 3 illustrates an example of a circuit design for how the voltage propagation operates in accordance with disclosed embodiments.

FIG. 3 illustrates an example of a circuit design for how the voltage propagation operates in accordance with disclosed embodiments. The embodiment of the circuit design in FIG. 3 is for illustration only. FIG. 3 does not limit the scope of this disclosure to any particular implementation of an electronic device.

The voltage propagation typically needs to be performed for multiple iterations before voltage values on nets of the circuit design become stable. Here, stable means unchanged from one iteration to the next iteration or that one preset condition is met. One example of the one preset condition may be a maximum number of the iterations being reached.

FIG. 3 shows an example of a circuit design 300 for illustrating how the voltage propagation operates according to some embodiments of the disclosed technology. The circuit design 300 includes an inverter and two transmission gates. The inverter includes two transistors 305 and 315; the first transmission gate includes two transistors 325 and 335; and the second transmission gate includes two transistors 345 and 355. Ports 310 and 340 are the input and output of the circuit design, respectively. Ports 370 and 380 are connected to the power supply and ground rails, respectively. Ports 350 and 360 are for control signal inputs of the two transmission gates, respectively.

If the transistors 305 and 315 connected to the power/ground rails are considered for voltage propagation first, voltage values on the net 320 will become known. If the transistors 325 and/or 335 are considered next, voltage values on the net 330 will become known. Finally, after the transistors 345 and/or 355 are considered, voltage values on the net 340 will become known. For this sequence, one iteration of voltage propagation is sufficient to assign voltage values to all of the nets, and the next iteration will not change any of the voltage values. It should be noted that at least two iterations are normally needed for a voltage propagation process because it will not terminate until voltage values on the nets become stable or a predefined condition is met. The former is decided by checking whether or not the voltage values change from one iteration to the next. The latter is usually satisfied after multiple iterations.

If either of the two transmission gates is considered first, however, at least two iterations of voltage propagation are needed to assign voltage values to all of the nets. For example, if the transistors 325 and 335 are considered first, voltage values on neither of the two nets 320 and 330 will be assigned. After all of the transistors are analyzed once, only voltage values on the net 320 become known. At least one more iteration is needed to propagate the voltage values on the net 320 to the nets 330 and 340. Therefore, voltage values on the nets are said to be unstable after one iteration because voltage values on some of the nets are changed (here, from unknown to known) from the first iteration to the second iteration.

The number of iterations of voltage propagation required before voltage values on all nets of the circuit design 300 are stable thus depends, at least in part, upon the sequence of components of the circuit design 300 being considered. The circuit design 300 is a relatively simple circuit design. For a more complex circuit design, searching for a voltage propagation path such that one iteration is sufficient might be impractical for a voltage propagation tool. It is thus desirable to explore other approaches for accelerating voltage propagation.

Figure 4:
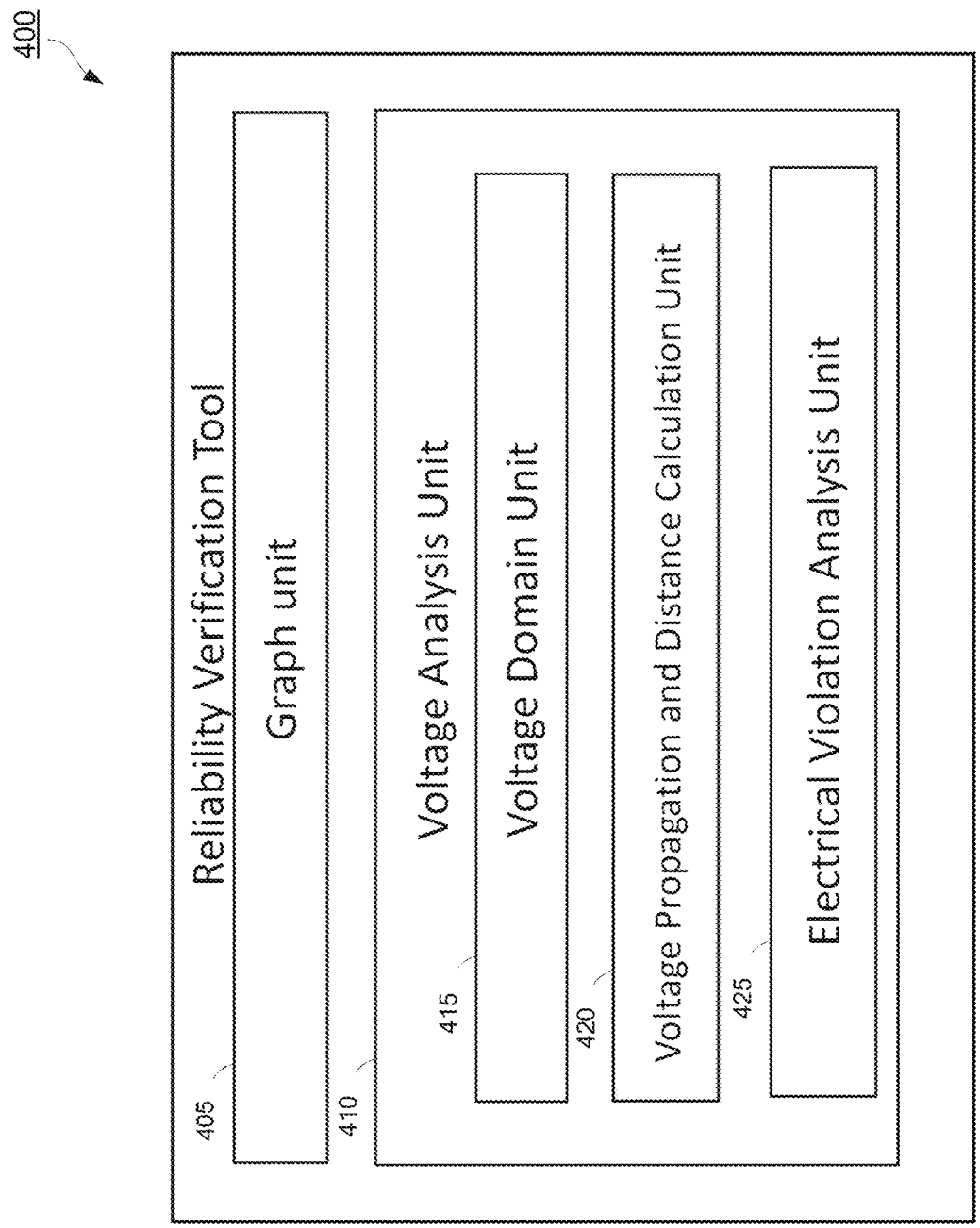
FIG. 4 illustrates an example of a reliability verification tool in accordance with disclosed embodiments.

FIG. 4 illustrates an example of a reliability verification tool 400 in accordance with disclosed embodiments. The embodiment of the reliability verification tool 400 in FIG. 4 is for illustration only. FIG. 4 does not limit the scope of this disclosure to any particular implementation of an electronic device.

The reliability verification tool 400 can perform the process of programmable electric rule checking (PERC). The reliability verification tool 400 includes a graph unit 405 and a voltage analysis unit 410. The reliability verification tool can be implemented on the master computer 103 or a slave computer 117 in FIG. 1 or the processor unit 201 in FIG. 2.

The graph unit 405 can receive a netlist corresponding to a circuit to be tested. The graph unit 405 can build a graph of the circuit using the netlist.

The voltage analysis unit 410 can use the graph to begin testing for device reliability in a circuit. The voltage analysis unit 410 includes a voltage domain unit 415, a voltage propagation and distance calculation unit 420 and an electrical violation analysis unit 425.

The voltage domain unit 415 can read the netlist to determine weights of different nodes in the graph. The voltage domain unit 415 can also program the nodes based on user input.

The voltage propagation and distance calculation unit 420 can perform PERC. PERC has two parts: the initialization part where both voltage and distance propagation take place and the rule-check part where the user gets to inspect the results of PERC's (initialization phase) work. In the second part, the user can ask (either in batch mode or interactively) for a backward trace of voltage and distance information from a sink node to a source node. Also in the second part, the table lookup and inspection of per node previously recorded distance information takes place.

Since circuits commonly have chains of both active and passive devices of length 1000 or more, detecting and ordering such simple and complex device chains can reduce iteration count by orders of magnitude and correspondingly speed up the minimum distance calculation, upon which the subsequent backward path transversal is based.

PERC already has the ability to trace a voltage (or other property type) path backward from sink to source. Therefore, PERC can tell a user if voltage X appears on the sink node and, if so, can produce a complete (net-pin-device-pin-net-pin-device . . . ) connected path list of devices, in order, that connect from sink to source. However, while this functionality is guaranteed to find such a voltage (or other property) path if it exists, it is not guaranteed (in normal operation) to find the minimum device path. There is an option to find the minimum device path—but, in practice, this option is not useful. That is because the tracing algorithm must enumerate all possible paths to find the minimum path—and it will return all paths traced (including the minimum path). In a modern IC there may be 100's or 1000's or 10^6 or more paths (especially if tracing to a power/ground rail is requested) potentially driving a sink node. This is a very time consuming, inefficient approach.

Also, netlists in the electrical design world, are generally, conveniently represented by mathematical graphs. A graph is composed of edges and vertices. Sometimes it is convenient to map a net to an edge and a device to a vertex, sometimes it is more convenient to map devices to edges and nets to vertices. PERC uses both representations, which means that, without loss of generality, this algorithm is applicable to quick calculation and retrieval of properties on both nets and devices.

This algorithm fundamentally breaks down into two parts: The first part is the calculation and recording of the minimum distance path per voltage per node (net). The second is the backward trace traversal and lookup of the minimum distance information to recover the net-pin-device-pin-net-pin-device path from net sink to device source.

The algorithm described here records both the voltage(s) (or other properties) on a net and also, as the iterative voltage propagation progresses, the distance (property) of the voltage from the initial source node (device) to the current node (device). This means that at the end of iterative voltage propagation it is now possible to interrogate any device and by means of a simple table lookup find the minimum (voltage/property) distance from the source node to the sink node which generated the particular voltage/property. Additionally, because each net now holds the minimum distance from the sink device of each individual voltage, backward tracing from any device only involves an interrogation of each of a device's pins to find the smallest distance. Since the current voltage distance is already known, as soon as distance-1 is found no further net pins need to be checked (unless an exhaustive catalog of all minimum paths is being requested). In practice, only one minimum path is necessary to satisfy an ESD check, since any path less than distance X is a design rule violation. Therefore, since minimum distances are recorded on every net it is no longer necessary to visit all ports (pins) of a net to find the minimum voltage path distance. As a result many fewer pins are visited and the minimum distance backward trace runs in orders of magnitude less time than an algorithm that must exhaustively trace all possible graph paths. In practice, on a full chip modern IC, this reduces computer runtime from days to minutes.

There is an overhead for this performance speed-up in backward path tracing. This overhead is an increase in memory usage (to store the distance information on a per-voltage, per-node basis) and in runtime to calculate and retain the minimum of possibly many voltage sink-to-source path distances. In practice the memory overhead is a small percentage of overall memory used by the reliability verification tool. On the other hand the runtime impact of the minimum distance calculation at each node can be substantial. The algorithm described here takes special precautions to minimize this calculation time as described next.

Figure 5A:
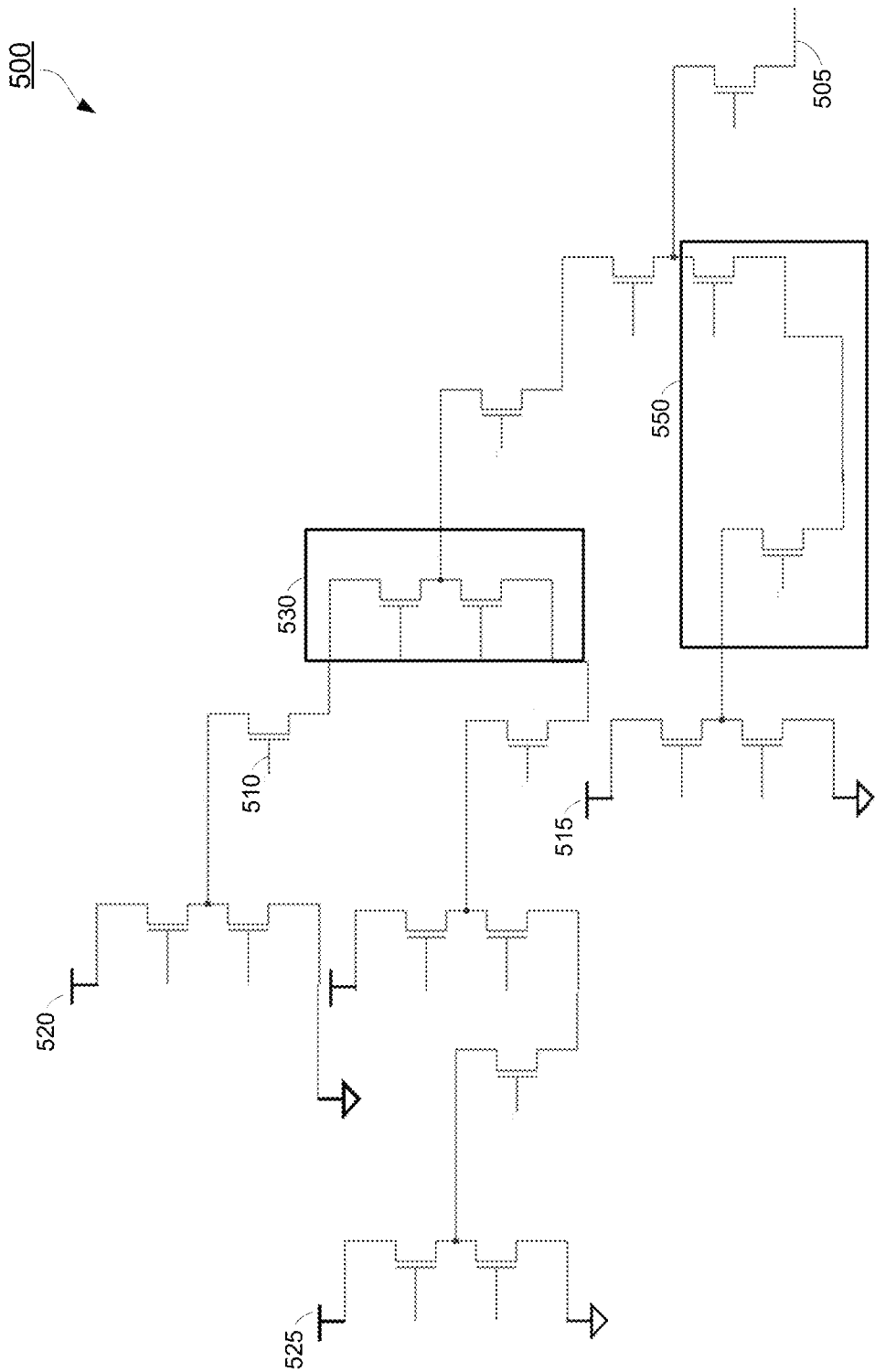
Figure 5C:
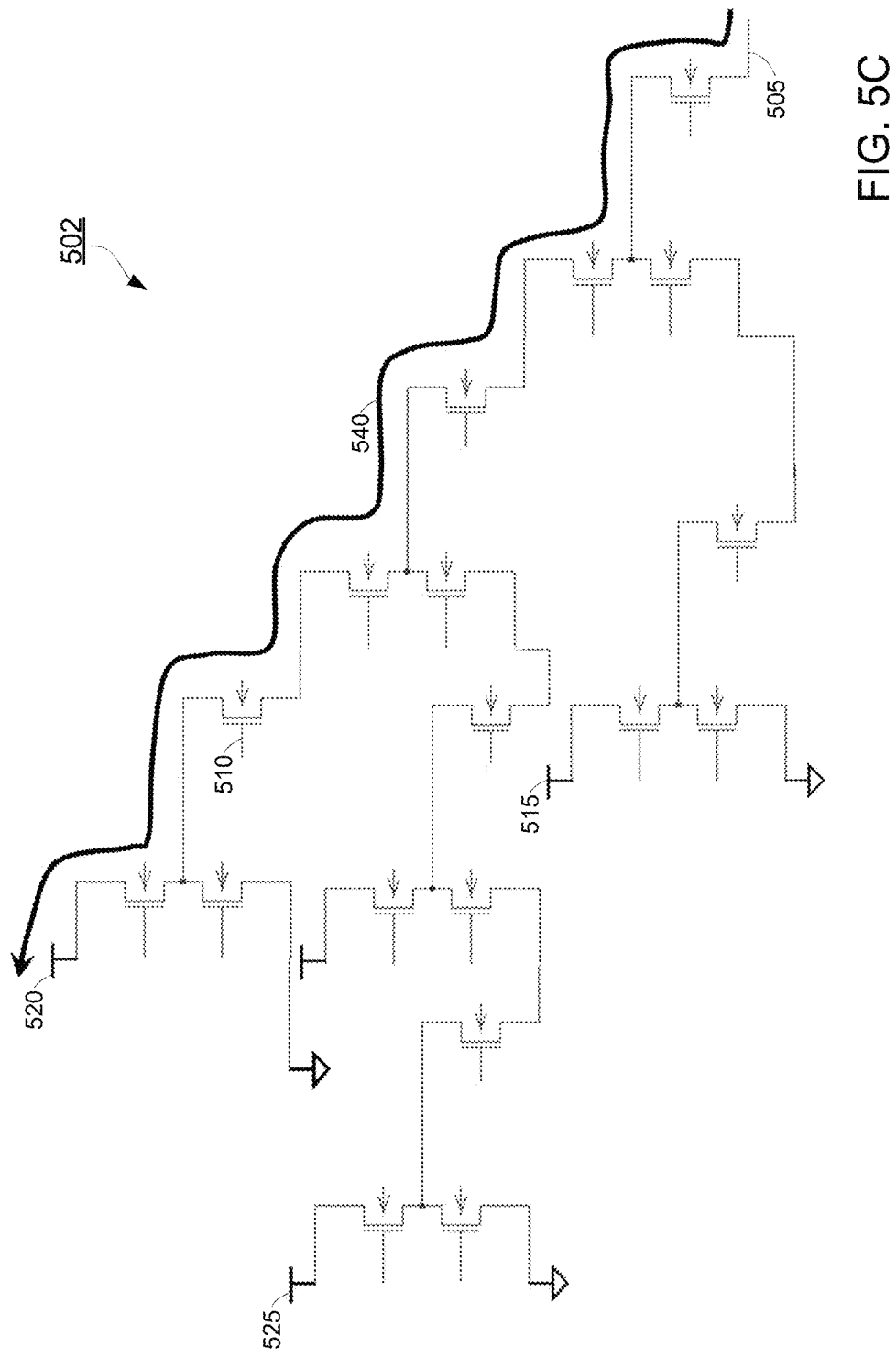

PERC's voltage propagation algorithm is iterative. This means that instead of directly solving for all voltages in a netlist simultaneously by constructing a set of equations each representing conditions on a particular net and then inverting the matrix, PERC examines a device's voltages in a local context and then propagates this result up the circuit hierarchy until the topmost (global) context is reached. At the global level the voltages are reconciled and the adjusted voltages propagated back down the netlist hierarchy. This upward/downward propagation constitutes one iteration. PERC declares a circuit to be voltage "stable" when no voltage on any net in the entire netlist has changed from iteration N to iteration N+1. Distance calculation runs in concert with voltage propagation. The wrinkle is that a netlist may reach voltage stability before it becomes distance "stable"—where distance stability means that the retained minimum distance value held in each node for each individual voltage for the entire netlist does not change from iteration N to iteration N+1. A netlist cannot become distance stable before it becomes voltage stable; voltage stability is a precondition for distance stability. The reason for this precondition is because one node (device) may be driven by multiple different voltage sources (other devices) where each device is the source of the same voltage. An example in a logic circuit is a mux where N nodes are multiplexed down to a single node. However an increasingly common electrical example at design rules of 10 nm and below, which make heavy use of FINFETs, is a set of devices paralleled to increase drive current or because of device size design rule constraints. In this latter case there may be 100's or 1000's of devices in parallel, each device delivering the same voltage to the source node via a separate path. In this case as soon as the first path in the set of parallel paths reaches the source node, the source node voltage becomes stable. However, among the parallel paths which have not yet been visited, there may be a path which traverses fewer devices—and therefore produces a shorter sink-to-source distance. The netlist cannot reach distance stability until all active net-pin-device-pin-net-pin-device paths have been evaluated. FIG. 5B-5D show different-distance, same-voltage paths from three different sources (at the same supply rail) to the sink node at the far right of each figure.

The electrical violation analysis unit 425 can review the determined properties in the netlist to identify violations of the circuit. The electrical violation analysis unit 425 can indicate the violations to in a user-readable medium. User-readable mediums can include a graph, special notification, report, etc.

FIGS. 5A-5D illustrate example tree-like graph 500 of a netlist with same-voltage paths in accordance with disclosed embodiments. The embodiments of the graph 500 in FIGS. 5A-5D are for illustration only. FIGS. 5A-5D do not limit the scope of this disclosure to any particular implementation of an electronic device.

Graph 500 is a graphical representation of a circuit read from a netlist. The graph 500 includes a sink 505, a plurality of devices 510, a first source 515, a second source 520, and a third source 525. In FIG. 5A, a repetitive unit 530 is boxed to indicate an example of parallel devices 510 and a hierarchical unit 550 is boxed to indicate an example of series device 510.

In FIG. 5B, the first source 515 is connected and an electrical path 535 runs from the sink 505 to the first source 515. The voltage is measured at the sink 505 and the distance is calculated for the electrical path 535, which includes four devices 510.

In FIG. 5C, the second source 520 is connected and an electrical path 540 runs from the sink 505 to the second source 520. The voltage is measured at the sink 505 and the distance is calculated for the electrical path 540, which includes six devices 510.

In FIG. 5D, the third source 525 is connected and an electrical path 545 runs from the sink 505 to the third source 525. The voltage is measured at the sink 505 and the distance is calculated for the electrical path 545, which includes eight devices 510.

In the determination of the distance of a path, each node or device can be "weighted" to treat all circuit element types as having a similar nominal circuit drop or voltage drop. The nominal amount for the drop can be include in the netlist or programmed by a user. Therefore the drop in the voltage between the sink and the source can determined the amount of device on a specific path. A user can assign a constant voltage drop between two pins of a device, or the user can add customized code to calculate a complex voltage profile as a device is traversed. If the voltage changes during traversal then the final voltage will be recorded at the voltage sink along with the final calculated distance which would, in this case, represent the distance to the sink from the device which constructed the final (not the initial) voltage.

Figure 6:
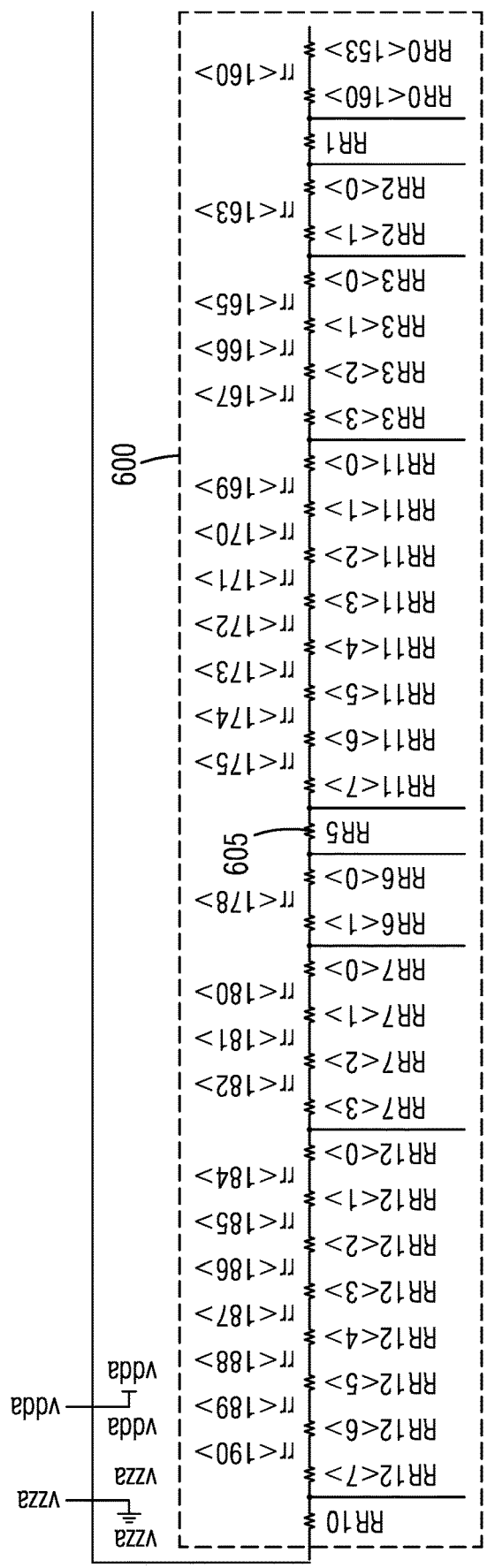
FIG. 6 illustrates an example of a series chain of resistors that are voltage stable in accordance with disclosed embodiments.

FIG. 6 illustrates an example of a series chain 600 of resistors that are voltage stable in accordance with disclosed embodiments. The embodiment of the series chain 600 in FIG. 6 is for illustration only. FIG. 6 does not limit the scope of this disclosure to any particular implementation of an electronic device.

Voltage and distance propagation share a similar characteristic: voltage and distance information is propagated on a device-by-device basis as the netlist is traversed. During each iterative traversal of the netlist each visited device is marked so that it will not be visited more than once per iteration. This is done to prevent being caught in an unproductive loop if there occurs a netlist path that folds back on itself. The direct result of this condition is that each device may be visited no more than once per iteration. Now assume a series chain 600 of resistors 605 are voltage-stable and that the retained distance value of the resistor at the far left has been modified. When the order of device visitation is from right to left, then the distance value of the resistor just to the right of the far left resistor will have its distance value updated. However, the resistor to its right will not see a distance update because when it was visited (it was visited prior to the resistor just to the right of the far left resistor) there was no distance value difference on either of its resistor neighbors. This is the worst-case scenario which results in only a single device being updated on each netlist iteration. Therefore a chain of N devices can take N iterations to become distance-stable. Program runtime directly correlates with the number of iterations a netlist takes to become stable.

In order to reduce the number of distance iterations the algorithm here employs a set of circuit recognition techniques. For example, the algorithm can recognize a series of 2-pin interconnected device/nets. The algorithm can then order these devices and determine the direction of the majority voltage flow (current flow may be bi-directional, bi-directional flows are also handled by the algorithm by prioritizing directional search based on the number of different voltages flowing in each direction). With proper ordering and traversal, an N-device series chain 615 will always become distance stable in 2 additional iterations. One iteration will propagate distance information to all devices in the chain and the second iteration will confirm distance stability. In FIG. 6, note that some nets show branches. The complete chain in this figure can be broken down into a set of "pure" chains—devices interconnected by 2-pin nets. This set of pure chains can then be sewn together during distance propagation to preserve the device ordering advantage and reduce iteration number.

Figure 7:
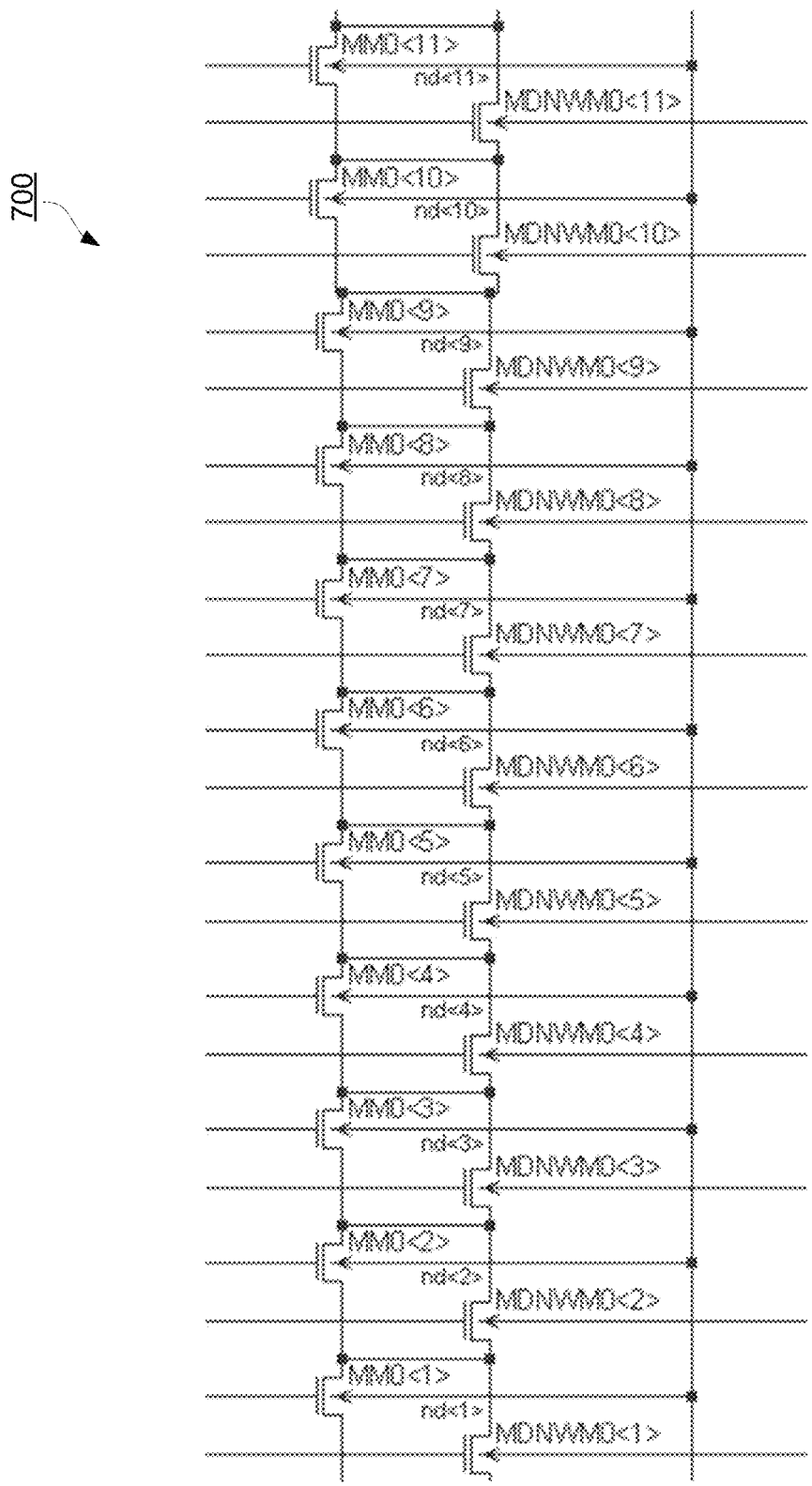
FIG. 7 illustrates an example chain of parallel and series devices in accordance with disclosed embodiments.

FIG. 7 illustrates an example chain 700 of parallel and series devices in accordance with disclosed embodiments. The embodiment of the chain 700 in FIG. 7 is for illustration only. FIG. 7 does not limit the scope of this disclosure to any particular implementation of an electronic device.

FIG. 7 shows a chain 700 of parallel/series devices. Typically LVS reduction schemes cannot reduce (simplify) such a chain because the devices shown here do not share a common bulk connection and may not share a common gate connection. In the case of bi-directional source-to-drain and drain-to-source voltage/distance propagation in a vectorless mode (all devices considered "on"), the connectivity of gate and bulk pins isn't relevant. Therefore, for voltage/distance propagation purposes these device pins may be ignored. The algorithm implemented here simplifies this device chain and constructs an optimal (2-iteration) traversal path per direction. For bi-directional paths, PERC will traverse left-to-right and then right-to-left (for example) and then add an additional iteration to confirm distance stability, therefore 3 iterations are needed to optimally settle bi-directional chains.

Figure 8:
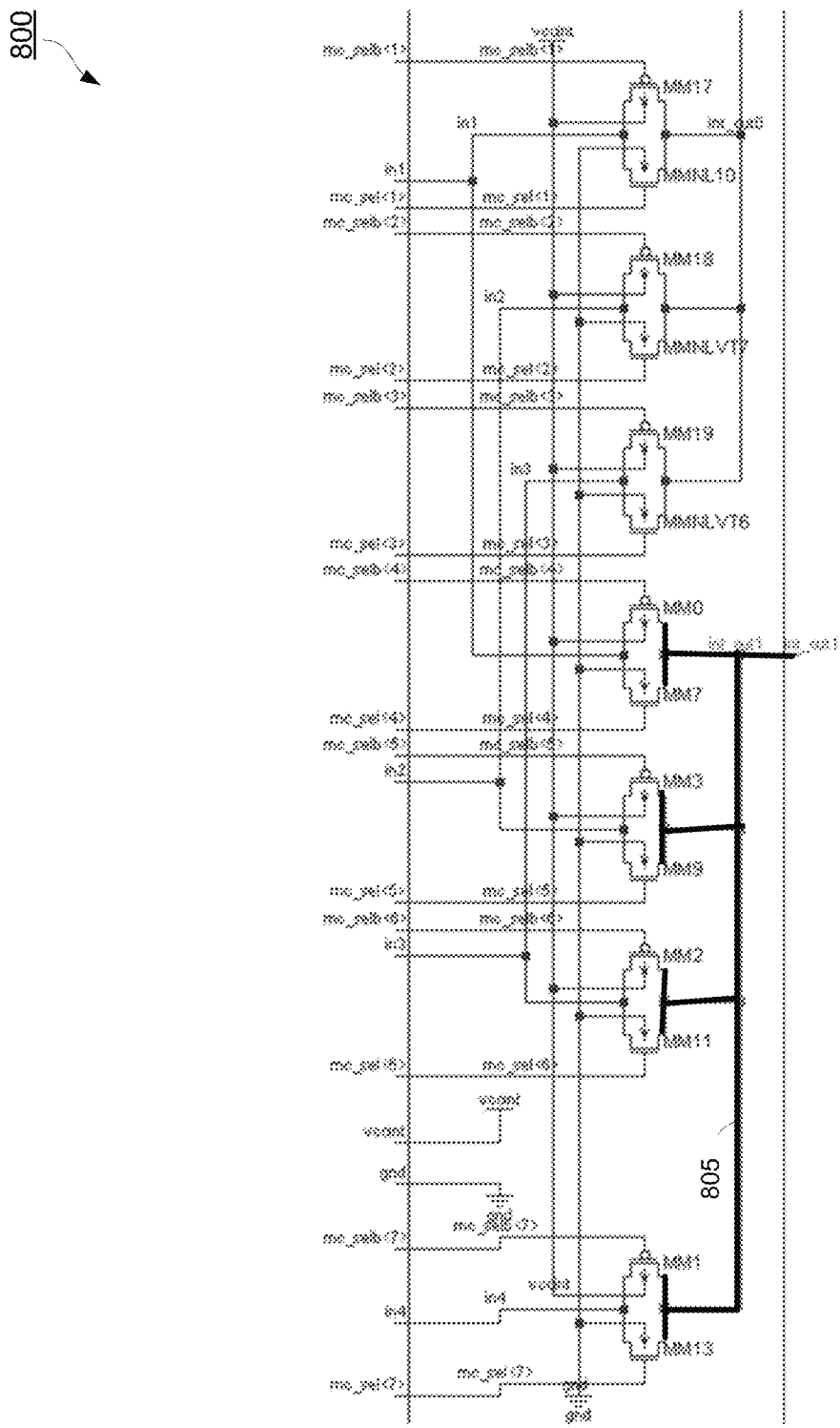
FIG. 8 illustrates an example of a mux circuit in accordance with disclosed embodiments.
Figure 9:
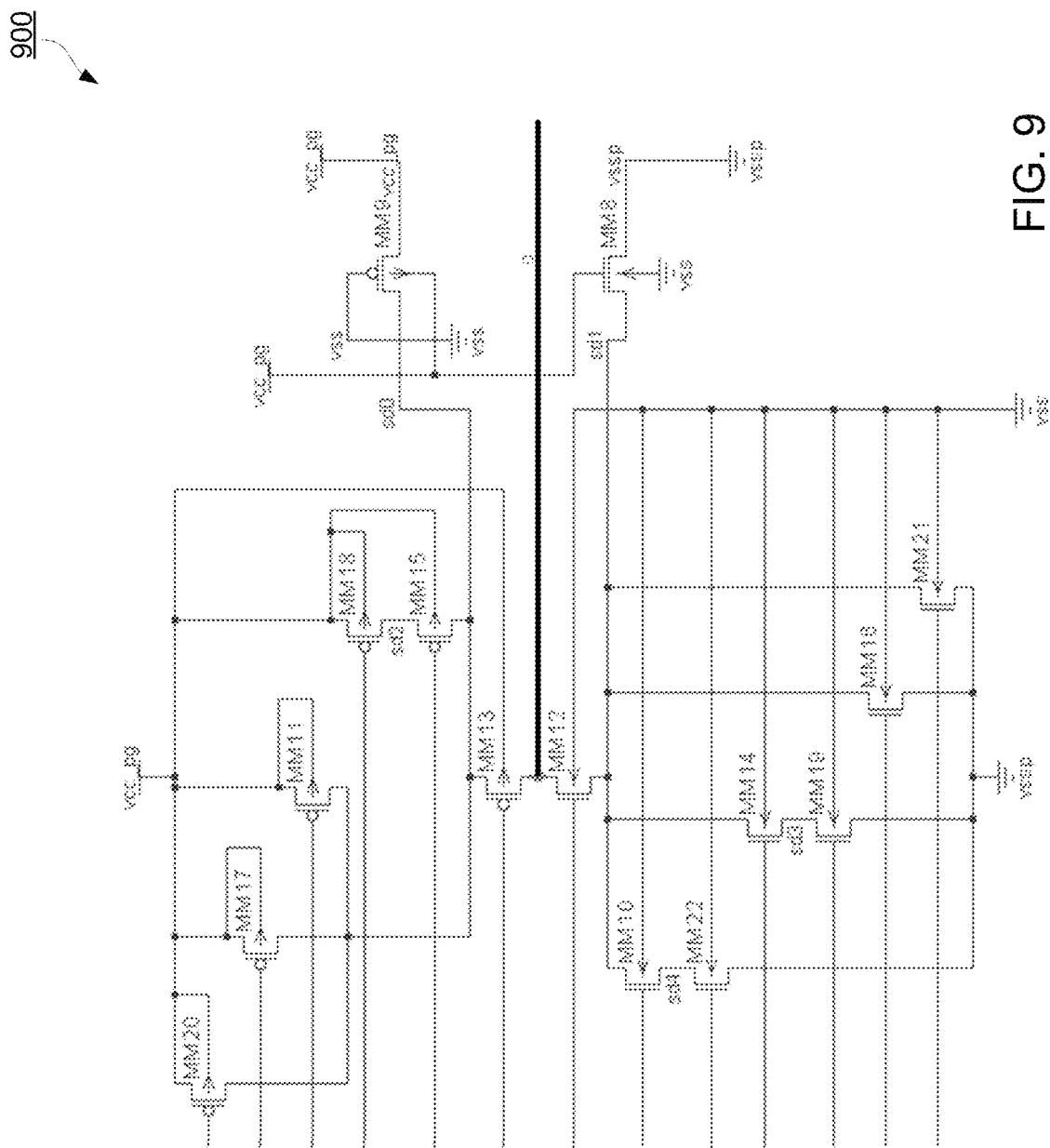
FIG. 9 illustrates an example of a series and parallel MOSFET element in accordance with disclosed embodiments of the present disclosure.

FIG. 8 illustrates an example of a mux circuit 800 in accordance with disclosed embodiments. The embodiment of the mux circuit 800 in FIG. 8 is for illustration only. FIG. 8 does not limit the scope of this disclosure to any particular implementation of an electronic device. FIG. 9 illustrates an example of a series and parallel MOSFET element 900 in accordance with disclosed embodiments of the present disclosure. The embodiment of the MOSFET element 900 in FIG. 9 is for illustration only. FIG. 9 does not limit the scope of this disclosure to any particular implementation of an electronic device.

The complementary pass devices 805 of the mux may be evaluated in parallel (This algorithm is suitable for implementation on a parallel processor with multiple code threads operating in tandem.) Further reduction in iteration number may be achieved by topological analysis of the repetitive elements of the mux (and of cascaded muxes) so that the basic mux unit need only be evaluated once and then its characterization applied on each succeeding unit.

FIGS. 10A-10E illustrate examples of sequence of path tracing 1000-1004 in accordance with disclosed embodiments. The embodiments of the path tracing 1000-1004 in FIGS. 10A-10E is for illustration only. FIGS. 10A-10E do not limit the scope of this disclosure to any particular implementation of an electronic device.

The path tracing 1000-1004 for a circuit that includes a source 1005, a sink 1010, a plurality of resistors 1015, 1020, 1025, 1030 and voltage detectors 1035, 1040, 1045. The path 1050 of the tracing begins at the sink 1010 in the direction of the source 1005. As the circuit begins to propagate, the voltages are read at the voltage detectors 1035, 1040, 1045. In the first path tracing 1000, the voltage at the third voltage detector 1045 is known and constant, which means that the fourth resistor 1030 is voltage stable. The voltages read in the first voltage detector 1035 and the second voltage detector 1040 are not known, which means that the first resistor 1015, second resistor 1020 are not voltage stable.

Figure 10A:
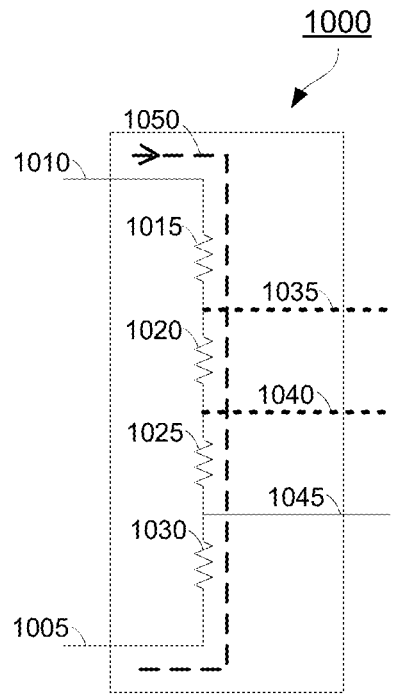
FIGS. 10A-10E illustrate examples of a sequence of path tracing in accordance with disclosed embodiments.
Figure 10B:
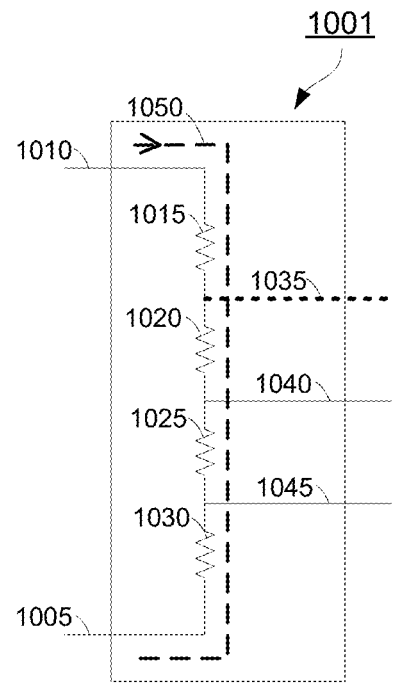
Figure 10C:
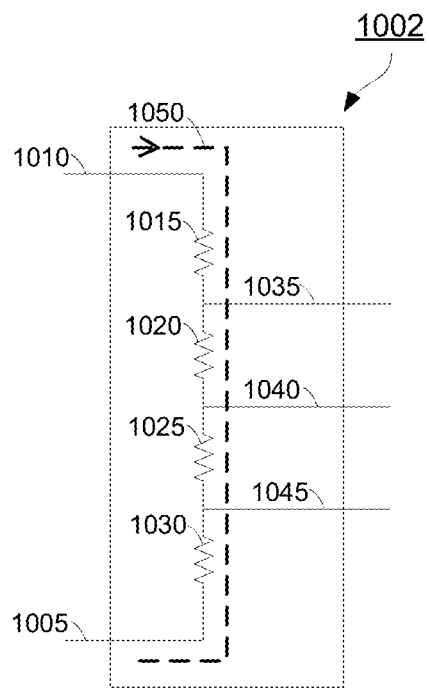

In path tracing 1001 iteration of FIG. 10B, the first voltage detector 1035 is not known, while the second voltage detector 1040 is now known and constant. The third resistor 1025 is now determined to be voltage stable. In the path tracing 1002 iteration of FIG. 10C, the first voltage detector is now known and constant and the second resistor 1020 is determined to be voltage stable.

Figure 10D:
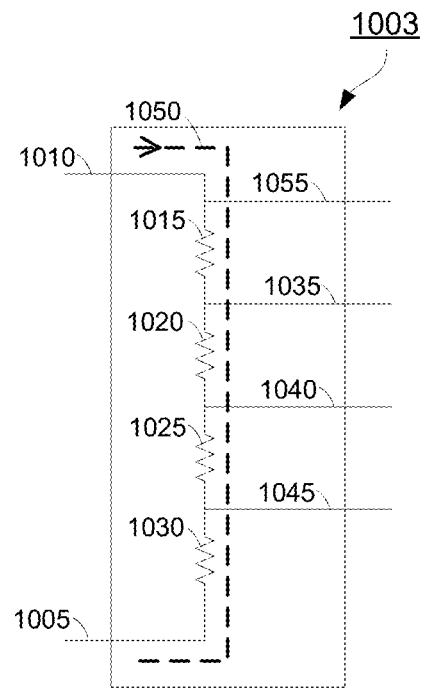
Figure 10E:
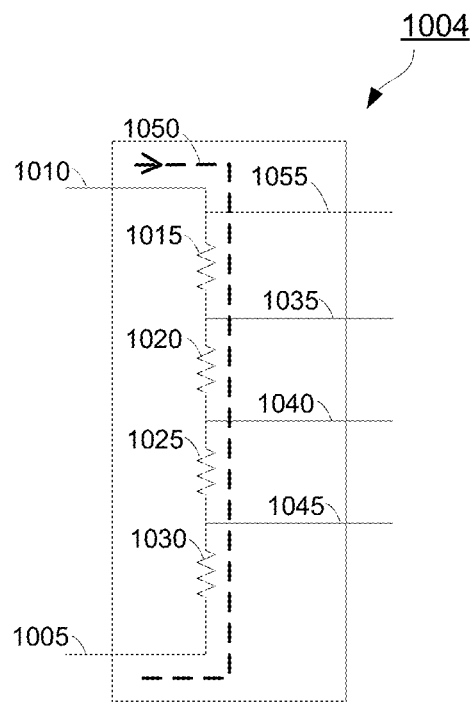

In the path tracing 1003 iteration of FIG. 10D, a fourth voltage detector 1055 has been placed before the first resistor 1015 and determined to be known and constant, which means the first resistor is voltage stable. In the path tracing 1004 iteration of FIG. 10E, the first voltage detector 1035, the second voltage detector 1040, the third voltage detector 1045 and the fourth voltage detector 1055 are stable for consecutive iterations of path tracing 1003, 1004. This consecutive iterations of constant voltage indicates that the circuit itself is voltage stable.

Figure 11:
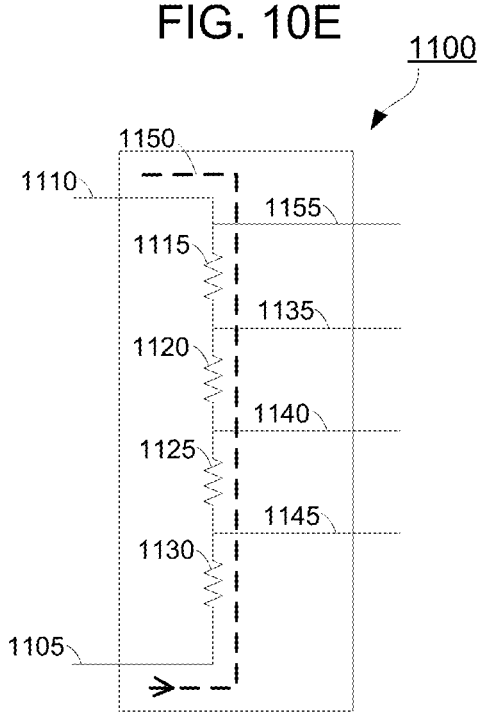
FIG. 11 illustrates an example for efficient bi-directional property-based path tracing in accordance with disclosed embodiments.

FIG. 11 illustrates an example for efficient bi-directional property-based path tracing 1100 in accordance with disclosed embodiments. The embodiment of the efficient bi-directional property-based path tracing 1100 in FIG. 11 is for illustration only. FIG. 11 does not limit the scope of this disclosure to any particular implementation of an electronic device.

In the path tracing 1100, the circuit includes a source 1105, a sink 1110, a plurality of resistors 1115, 1120, 1125, 1130 and voltage detectors 1135, 1140, 1145, 1155. The path 1050 of the tracing begins at the source 1105 in the direction of the sink 1110. The first iteration of path tracing 1100 checks the voltage detectors in order from voltage detector 1145, voltage detector 1140, voltage detector 1135 and voltage detector 1155. Because the voltage detectors are visited in the direction of current, only one iteration is required to reach voltage stability for each of the resistors 1115, 1120, 1125, 1130. The second iteration of the path tracing 1100 indicates no further change in voltage and that the circuit is voltage stable.

Figure 12:
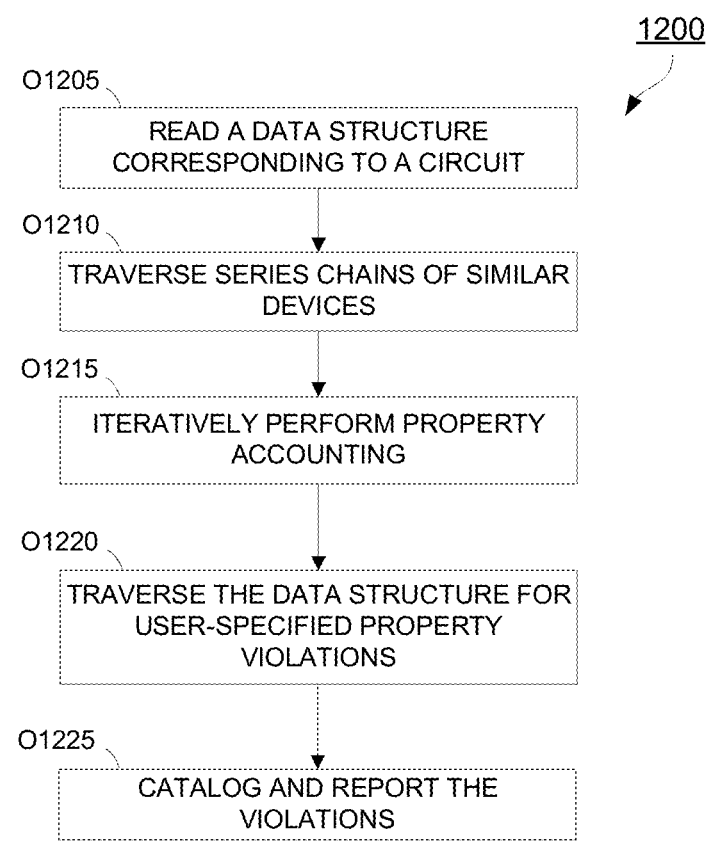
FIG. 12 illustrates a flowchart showing a process for efficient bi-directional property-based path tracing in accordance with disclosed embodiments.

FIG. 12 illustrates a flowchart showing a process for efficient bi-directional property-based path tracing in accordance with disclosed embodiments. For example, the process depicted in FIG. 12 may be performed by the master computer 103 in FIG. 1, the processor unit in FIG. 2, and the reliability verification tool 400 in FIG. 4.

The computer systems reads a data structure corresponding to a circuit (O1205). The circuit can include a plurality of devices in parallel and in series. The data structure could be a netlist, where the plurality of device are defined in terms of location and expected resistance in a circuit, etc. The computer system can create a graph using the netlist for the purposes of traversing the circuit using voltage propagation. "Reading" the data structure can include loading the data structure from storage or receiving the data structure from another device or process.

The computer system traverses series chains of similar devices in the circuit to reduce the iteration count and arrive at circuit stability (O1210). The circuit stability is determined when the propagated user-specified circuit properties remain unchanged between subsequent iterations of the traversing. The computer system can traverse the circuit backwards from a user-specified start point at a sink to a voltage source to construct a net-pin-device-pin-net-pin-device circuit path.

The computer system iteratively performs property accounting of properties as voltages propagate across devices in the circuit (O1215). In this way, in a concurrent manner, the computer system connects all circuit sources with all circuit sinks.

Operation O1215 is intertwined with O1210. The algorithm first discovers and places chains of similar devices in an advantageous order and then allows iterative propagation to proceed. In this way the number of (future) iterations is reduced—because the series chains have previously been detected. The "intertwining" comes from the fact that the direction of traversal of the previously ordered devices is determined later—during each propagation iteration. In practice, the algorithm can traverse a chain of devices from right-to-left on iteration N and then from left-to-right on iteration N+M, if the computer system calculates doing so will reduce the total iteration count.

The computer system can interrogate pin voltages and corresponding properties on each pin of the device. The computer system can store the pin voltages and the corresponding properties with the device information in the data structure.

The computer system can also recognize a series chain in the circuit. The recognizing can include the computer system ordering the similar device in a manner that an iteration-to-property-stability count is a constant value.

The recognizing can also include the computer system storing property information with device information in the data structure. For example, the computer system can determine the distance for a device or a source from a sink and record the distances of each device or source.

The number of iterations required to attain property stability is reduced by recognizing hierarchical and repetitive elements in the circuit. The hierarchical elements are identified explicitly in the read data structure or recognized during the iteratively performed property accounting of the properties.

The repetitive elements can be identified by pattern-matching or topological analysis in the iteratively performed property accounting of the properties. Iteratively performed property accounting of the properties can include prioritizing device iteration direction of current flow to reduce an iteration-to-property-stability count using circuit theory laws.

When a property stability of a propagated property is conditional on a second propagated property, circuit stability is attained when both the initial property and the second property remain unchanged for all devices and nets between subsequent iterations The computer system traverses the data structure for user-specified property violations (O1220). Property violations can include duplicate structures, short paths, incorrect voltages, etc.

The computer system catalogs and reports these violations in human-readable form (O1225). The computer system can note the violations on the graph, in a report, etc.

Although FIG. 12 illustrates an example of processes for efficient bi-directional property-based path tracing, various changes could be made to FIG. 12. Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of the data processing system may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle. The use of terms such as (but not limited to) "mechanism," "module," "device," "unit," "component," "element," "member," "apparatus," "machine," "system," "processor," or "controller," within a claim is understood and intended to refer to structures known to those skilled in the relevant art, as further modified or enhanced by the features of the claims themselves, and is not intended to invoke 35 U.S.C. § 112(f).

What is claimed is:

1. A method for efficient bi-directional property-based path tracing, comprising:

reading a data structure corresponding to a circuit;
traversing series chains of similar devices in the circuit to reduce an iteration count and arrive at a circuit stability, wherein the circuit stability is determined when propagated user-specified and computed circuit properties remain unchanged between subsequent iterations of the traversing;
iteratively performing property accounting of properties as voltages propagate across devices in the circuit;
traversing the data structure for the propagated user-specified and computed property violations; and
cataloging and reporting the propagated user-specified and computed violations in human-readable form.

2. The method of claim 1, further comprising:
recognizing a series chain in the circuit, which includes:
ordering the similar devices in a manner that an iteration-to-property-stability count is a constant value; and
storing property information with device information in the data structure.

3. The method of claim 2, further comprising:
interrogating pin voltages and corresponding properties on each pin of the devices; and
storing the pin voltages and the corresponding properties with the device information in the data structure.

4. The method of claim 1, further comprising:
traversing the circuit backwards from a user-specified start point to a voltage source to construct a propagated net-pin-device-pin-net-pin-device circuit path.

5. The method of claim 1, wherein:
a number of iterations required to attain propagated property stability is reduced by recognizing hierarchical elements and repetitive elements in the circuit,
the hierarchical elements are identified explicitly in the read data structure or recognized during the iteratively performed property accounting of the properties, and
the repetitive elements are identified by pattern-matching and topological analysis in the iteratively performed property accounting of the properties.

6. The method of claim 1, wherein the iteratively performed property accounting of the properties includes:
prioritizing device iteration direction of current flow to reduce an iteration-to-property-stability count using circuit theory laws.

7. The method of claim 1, wherein:
when a property stability of a propagated user-specified property is conditional on a second property, circuit stability is attained when both the user-specified property and the second propagated property remain unchanged for all devices and nets between subsequent iterations.

8. A computer system comprising:
a processor; and
an accessible memory, the computer system configured to:
read a data structure corresponding to a circuit;
traverse series chains of similar devices in the circuit to reduce an iteration count and arrive at a circuit stability, wherein the circuit stability is determined when propagated user-specified circuit properties remain unchanged between subsequent iterations of the traversing;
iteratively perform property accounting of properties as voltages propagate across devices in the circuit;
traverse the data structure for propagated user-specified and computed property violations; and
catalog and report the propagated user-specified and computed property violations in human-readable form.

9. The computer system of claim 8 is further configured to perform:
recognizing a series chain in the circuit, which includes:
ordering the similar devices in a manner that an iteration-to-property-stability count is a constant value; and
storing property information with device information in the data structure.

10. The computer system of claim 9 is further configured to perform:
interrogating pin voltages and corresponding properties on each pin of the devices; and
storing the pin voltages and the corresponding properties with the device information in the data structure.

11. The computer system of claim 8 is further configured to perform:
traversing the circuit backwards from a user-specified start point to a voltage source to construct a propagated net-pin-device-pin-net-pin-device circuit path.

12. The computer system of claim 8, wherein:
a number of iterations required to attain propagated property stability is reduced by recognizing hierarchical elements and repetitive elements in the circuit,
the hierarchical elements are identified explicitly in the read data structure or recognized during the iteratively performed property accounting of the properties, and
the repetitive elements are identified by pattern-matching and topological analysis in the iteratively performed property accounting of the properties.

13. The computer system of claim 8, wherein the iteratively performed property accounting of the properties includes:
prioritizing device iteration direction of current flow to reduce an iteration-to-property-stability count using circuit theory laws.

14. The computer system of claim 8, wherein:
when a property stability of a propagated user-specified property is conditional on a second property, circuit stability is attained when both the user-specified property and the second propagated property remain unchanged for all devices and nets between subsequent iterations.

15. A non-transitory computer-readable medium storing with executable instructions that, when executed, cause one or more computer systems to:
read a data structure corresponding to a circuit;
traverse series chains of similar devices in the circuit to reduce an iteration count and arrive at a circuit stability, wherein the circuit stability is determined when propagated user-specified circuit properties remain unchanged between subsequent iterations of the traversing;
iteratively perform property accounting of properties as voltages propagate across devices in the circuit;
traverse the data structure for propagated user-specified and computed property violations; and
catalog and report these violations in human-readable form.

16. The non-transitory computer-readable medium of claim 15, wherein the executable instructions that, when executed, further cause the one or more computer system to perform:
recognizing a series chain in the circuit, which includes:

ordering the similar devices in a manner that an iteration-to-property-stability count is a constant value; and storing property information with device information in the data structure.

17. The non-transitory computer-readable medium of claim 16, wherein the executable instructions that, when executed, further cause the one or more computer system to perform:

interrogating pin voltages and corresponding properties on each pin of the devices and nets; and storing the pin voltages and the corresponding properties with the device and net information in the data structure.

18. The non-transitory computer-readable medium of claim 15, wherein the executable instructions that, when executed, further cause the one or more computer system to perform:

traversing the circuit backwards from a user-specified start point to a voltage source to construct a propagated net-pin-device-pin-net-pin-device circuit path.

19. The non-transitory computer-readable medium of claim 15, wherein:

a number of iterations required to attain property stability is reduced by recognizing hierarchical elements and repetitive elements in the circuit, the hierarchical elements are identified explicitly in the read data structure or recognized during the iteratively performed property accounting of the properties, and the repetitive elements are identified by pattern-matching and topological analysis in the iteratively performed property accounting of the properties.

20. The non-transitory computer-readable medium of claim 15, wherein the iteratively performed property accounting of the properties includes:

prioritizing device iteration direction of current flow to reduce an iteration-to-property-stability count using circuit theory laws.

21. The non-transitory computer-readable medium of claim 15, wherein:

when a property stability of a propagated user-specified property is conditional on a second property, circuit stability is attained when both the user-specified property and the second propagated property remain unchanged for all devices and nets between subsequent iterations.

* * * * *